(12) United States Patent
Breuer et al.

(10) Patent No.: US 7,494,129 B2
(45) Date of Patent: Feb. 24, 2009

(54) PISTON RING

(75) Inventors: Claus Breuer, Wermelskirchen (DE); Richard Mittler, Leverkusen (DE)

(73) Assignee: Federal Mogul Burscheid GmbH, Burscheid (DE)

( * ) Notice: Subject to any disclaimer, the term of this patent is extended or adjusted under 35 U.S.C. 154(b) by 15 days.

(21) Appl. No.: 10/551,245

(22) PCT Filed: Jan. 31, 2004

(86) PCT No.: PCT/DE2004/000150

§ 371 (c)(1), (2), (4) Date: Sep. 28, 2005

(87) PCT Pub. No.: WO2004/088179

PCT Pub. Date: Oct. 14, 2004

(65) Prior Publication Data

US 2006/0255546 A1 Nov. 16, 2006

(30) Foreign Application Priority Data

Mar. 28, 2003 (DE) .................... 103 14 034

(51) Int. Cl.
*F16J 9/00* (2006.01)
(52) U.S. Cl. .................... 277/466; 277/490
(58) Field of Classification Search ............ 277/459, 277/460, 466, 434, 489, 490, 498, 499
See application file for complete search history.

(56) References Cited

U.S. PATENT DOCUMENTS

| | | | | |
|---|---|---|---|---|
| 1,645,146 A | * | 10/1927 | Kinsley et al. | 277/446 |
| 2,325,298 A | * | 7/1943 | Barnes | 277/471 |
| 2,591,920 A | * | 4/1952 | Colvin | 277/434 |
| 2,970,023 A | * | 1/1961 | Thompson | 277/460 |

FOREIGN PATENT DOCUMENTS

| | | |
|---|---|---|
| DE | P.A. 092616 | 2/1954 |
| DE | 3920449 | 1/1991 |
| JP | XP 002286090 | 4/1976 |

(Continued)

OTHER PUBLICATIONS

English Translation of SU 504906, May 2007.*

(Continued)

*Primary Examiner*—Patricia Engle
*Assistant Examiner*—Gilbert Lee
(74) *Attorney, Agent, or Firm*—Robert L. Stearns; Dickinson Wright PLLC.

(57) ABSTRACT

The invention relates to a piston ring comprising a slit forming a joint, a bearing surface, an inner peripheral surface, and upper and lower flanks extending thereinbetween. An inconstant cross-sectional interruption is provided in the region of the inner peripheral surface and, seen from the peripheral direction, is larger in the region of the joint than in the region which diametrically opposes the joint. The wall thickness of the inventive piston ring varies in the peripheral direction and is smaller in the region of the joint than in the region which diametrically opposes the joint. The relation between the wall thickness and the cross-sectional interruption is always such that the piston ring has a constant torsional angle, seen over the periphery.

1 Claim, 2 Drawing Sheets

FOREIGN PATENT DOCUMENTS

| | | |
|---|---|---|
| JP | 58207575 | 3/1983 |
| JP | 59043260 | 10/1984 |
| JP | 02229964 | 9/1990 |
| JP | 09196171 | 7/1997 |
| SU | 504906 * | 2/1976 |

OTHER PUBLICATIONS

Die Twistwinkel Des L-Formigen Kolbenringes, 1975, Eng. Abstract, p. 3.

* cited by examiner ring gap ... ring back ring gap ... ring back

PISTON RING

BACKGROUND OF THE INVENTION

1. Technical Field

The present invention concerns a piston rings, and more particularly to the geometry of the piston ring.

2. Related Art

DE-C 39 20 449 shows a self-tightening, air-tight piston ring, the upper plane surface of which, in the installed position, is in contact with the piston's grooved plane surface from the mid-point of the latter's radius to its center. The piston ring's lower plane surface is sloped, relative to the piston's grooved surface, such that the latter, from the mid-point of its radius to its center, is likewise in contact with the piston ring. The cross-section of the inner circumferential surface shows a variation in the form of a bevel.

U.S. Pat. No. 2,591,920 shows a piston ring which is equipped with a variable configuration in its cross-section cut in the area of its inner circumferential surface.

A piston ring for internal combustion engines, which possesses varying wall thicknesses seen across its circumference, has become known through JP-A 09196171.

Piston rings available on today's market often plan for a twisting of the piston ring by maintaining a consistent angle across the cross-section cut (for example, the internal angle or bevel). This consistent cross-section working under the bending tension of installation causes an uneven twisting in the ring in accordance with piston ring design theory, regardless of the circumference.

SUMMARY OF THE INVENTION AND ADVANTAGES

This invention is based on the task of building and developing a generic piston ring that remains in contact with its friction surface on the cylinder wall, and with the internal surface on the lower groove center, without gas pressurization across the entire operational phase, and concurrently contributing to better oil consumption and control.

This objective is accomplished by the piston ring having a wall thickness varying the circumferential surface, where the area of the joint has a lesser wall thickness as compared to the area diametrically opposed to the joint, where the relationship of wall thickness to circumferential surface is consistently so formed that the piston ring, viewed across its surface, exhibits a constant angle of twist.

Given changes or superimposing of the piston ring wall thickness and non-constant cross-section cut, a twisting of the piston ring can be induced, which, when viewed across the surface of the piston ring, brings about a constant angle of twist. With the subject of this invention it is now possible that the piston ring can be in contact solely with the edge of the friction surface on the cylinder wall, and with the inner edge in the lower groove edge. Varying twist angles, remaining consistent across the surface, can be induced using this type of wall thickness modification, with the previously mentioned cross-section cut. Using a non-constant varying cross-section cut across the surface of the piston ring, the surface moment of inertia can be varied across the surface of the ring in such a way that a consistent twisting of the ring is produced across the surface.

The cross-section cut can be induced across an inner edge or internal angle, where these can occur in the area of either the upper surface or the lower surface.

The following formula should indicate the relation between wall thickness and cross-section cut relative to the surface of the piston ring and constant twist angle:

$$\phi = Mt/G \ast I(\phi)$$ [mathematical formula illegible]

where $\phi$ is the twist angle

Mt is the bending load

G is the Slide module

I is the polar surface moment of inertia.

THE DRAWINGS

The subject of this invention is represented in the drawing examples in the diagrams and can be described as follows.

DETAILED DESCRIPTION

Figure 1:
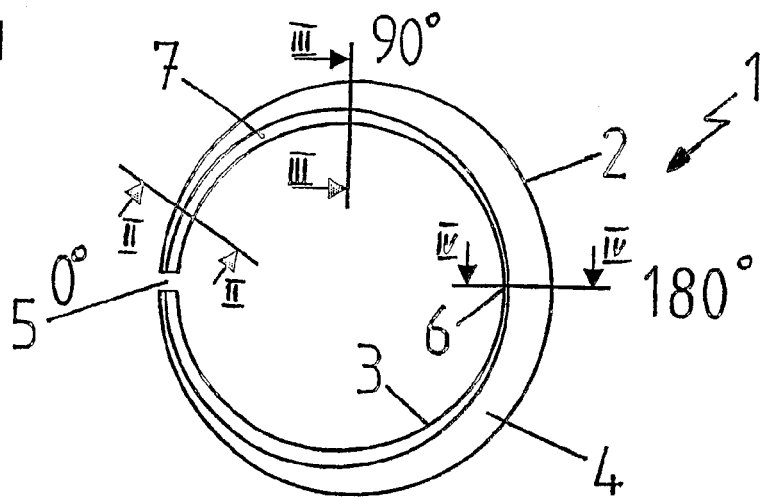
FIG. 1 is a piston ring with non-constant cross-section cut.

FIG. 1 depicts a piston ring 1, which can be installed into the first or second groove of a piston (not represented). Piston ring 1 is depicted in top view, so that only friction surface 2, the inner surface 3, as well as the upper flank 4 are recognizable. In the piston ring gap 5 the piston ring 1 exhibits a predeterminable wall thickness. The wall thickness t of the piston ring 1 varies, based on the gap 5 in the direction of the surface diametrically opposite 6 (180°) comprising the rear of the ring. At the rear of the ring 6, a wall thickness is given, which is thicker than the opposite side by the ring gap material cross-section. FIG. 1 depicts the area near the upper flank 4 with a cross-section cut 7 in the inner surface 3 in the form of a bevel. This bevel 7 begins with an equally large cross-section at the gap 5 and is reduced to the rear ring 6 equally in both directions of the surface. By means of this procedure the piston ring 1 maintains a constant twist angle, that is remaining consistent, over the surface.

Figure 2:
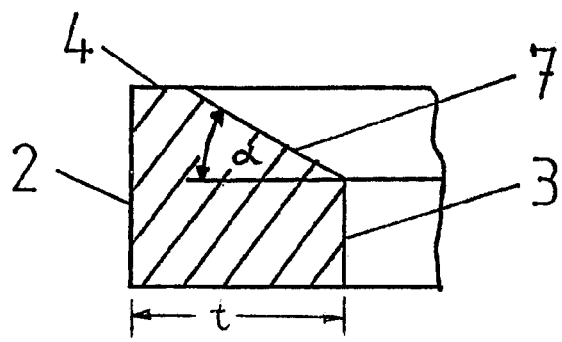
FIGS. 2 to 4 show various cross-sections of the piston ring in accordance with FIG. 1.
Figure 3:
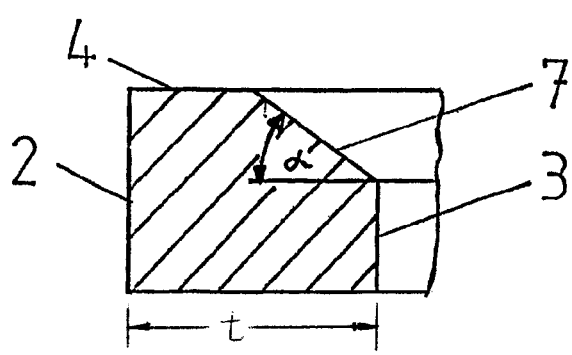
Figure 4:
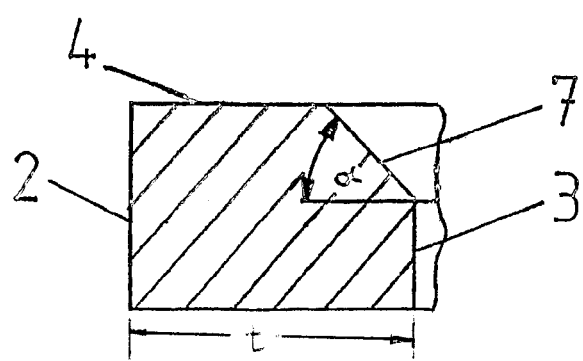

The cuts in accordance with FIG. 2 through FIG. 4 depict the friction surface 2, the inner surface circumference 3, and the cross-section cut 7 shown as a bevel, which comes in via the inner friction surface 3 into the upper flank 4. The cuts depict that the bevel 7 reaches its greatest extension at ring gap 5 (FIG. 1) and becomes lessened in the direction of the back of the ring 6.

In this manner various angles between the upper flank 4 and the inner surface 3 are formed, as viewed from the surface.

In FIGS. 1 through 4 cross-section cut 7 in the form of bevels are addressed. These same items, however, can be formed equally well by angular cross-sections in non-constant execution.

Figure 5:
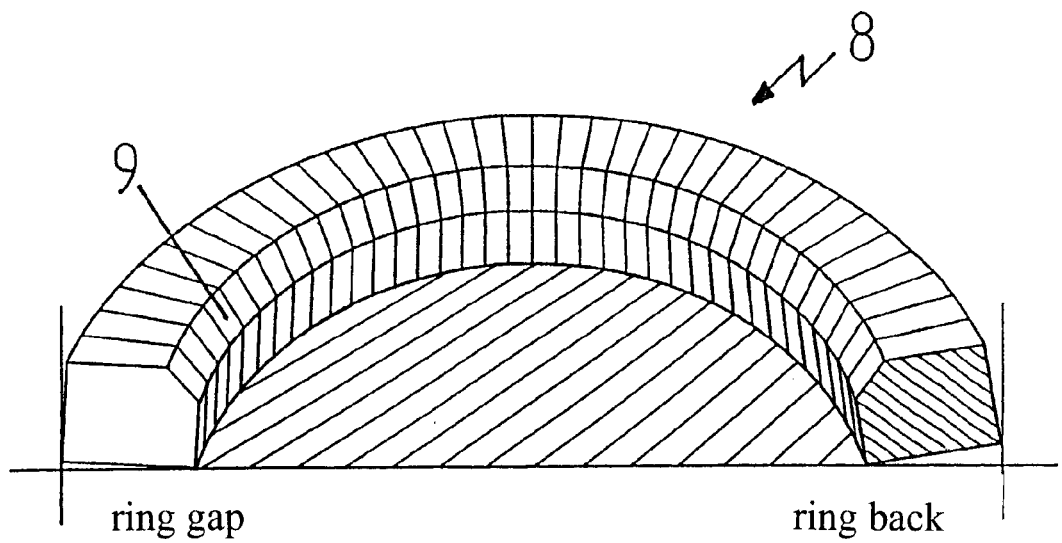
FIG. 5 is a piston ring according to the prior art having uniform wall thicknesses and consistent cross-section cut.

FIG. 5 shows a piston ring 8 at the state of the art, and actually in a twisted, that is 'installed' condition. The piston ring 8 is comprised of a consistent wall thickness throughout, and is equipped with an inner bevel 9 that is foreseen as a cross-section cut on the surface.

Figure 6:
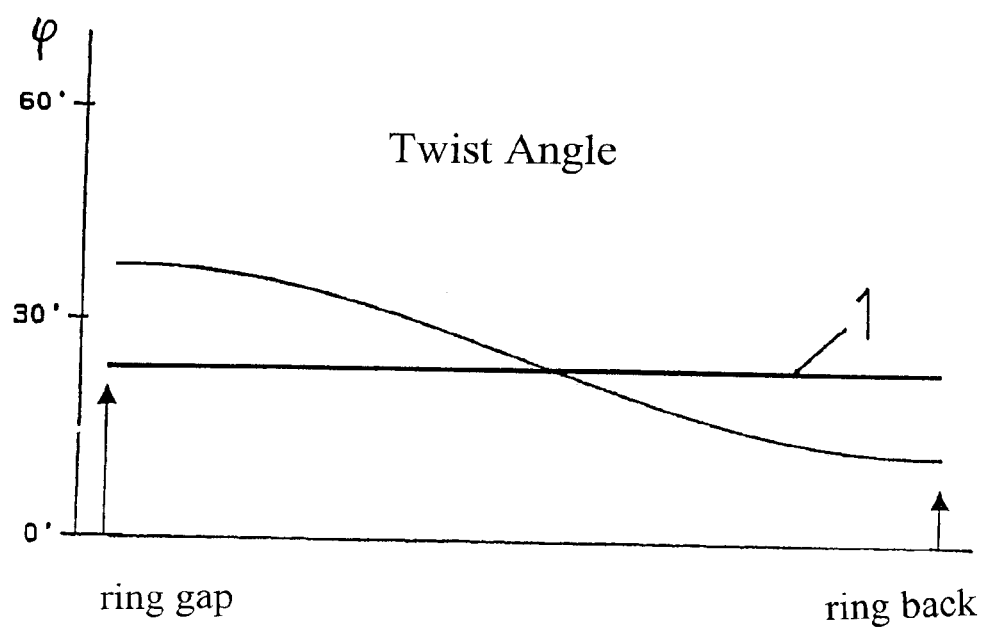
FIG. 6 illustrates the angle of twist in accordance with the current state of the art (FIG. 5) as well as with the piston ring in accordance with FIG. 1.

The image according to FIG. 6 shows that piston ring 8, starting from the ring gap (0°), takes on varying twist angles moving back to the rear of the ring. The constant cross-section cut has the effect across the surface of an uneven twisting of the piston ring 8, on the basis of piston ring theory, where the radial wall thickness remains constant under the bending tension of installation for ring 8. For piston ring 8 what should be achieved is that the ring will remain at the same twist angle, under all conditions, without gas pressure load, with only the friction surface on the cylinder wall and with the inner edge only on the lower groove, which however—as shown especially in FIG. 6—cannot be produced in an optimal manner, due to an uneven twisting in the surface direction.

It is only with piston ring 1, as represented in FIGS. 1 through 4, that a relativization of the twist angle, seen through the surface, can be produced, so that now in all running phases of ring 1, without gas pressure load, that the desired effect can be achieved with better oil usage control.

The invention claimed is:

1. A one-piece piston ring having a gap, an outer surface, an inner surface, an upper flank, and a lower flank; said piston ring further including a bevel extending between said upper flank and said inner surface, said bevel having an angle measured from a plane perpendicular to said inner and outer surfaces which varies in a circumferential direction of said piston ring such that the angle is smaller in an area adjacent said gap as compared to an area diametrically opposed to said gap; said bevel having a width which also varies in the circumferential direction and which is wider in the area adjacent said gap as compared to the area diametrically opposed to said gap; said lower flank having a radial wall thickness which also varies in the circumferential direction such that said thickness is smaller in the area adjacent said gap as compared to the area diametrically opposed to said gap.

* * * * *